United States Patent
Tamayo-Rios et al.

(10) Patent No.: US 11,416,523 B2
(45) Date of Patent: Aug. 16, 2022

(54) RECORD MATCHING MODEL USING DEEP LEARNING FOR IMPROVED SCALABILITY AND ADAPTABILITY

(71) Applicant: OpenLattice, Inc., Redwood City, CA (US)

(72) Inventors: Matthew Tamayo-Rios, Redwood City, CA (US); Joke Durnez, Redwood City, CA (US)

(73) Assignee: Fastly, Inc., San Francisco, CA (US)

( * ) Notice: Subject to any disclaimer, the term of this patent is extended or adjusted under 35 U.S.C. 154(b) by 164 days.

(21) Appl. No.: 16/868,292

(22) Filed: May 6, 2020

(65) Prior Publication Data
US 2020/0364243 A1     Nov. 19, 2020

Related U.S. Application Data

(60) Provisional application No. 62/843,955, filed on May 6, 2019.

(51) Int. Cl.
| | | |
|---|---|---|
| *G06F 16/28* | (2019.01) | |
| *G06F 16/2458* | (2019.01) | |
| *G06N 20/00* | (2019.01) | |

(52) U.S. Cl.
CPC ........ *G06F 16/285* (2019.01); *G06F 16/2458* (2019.01); *G06N 20/00* (2019.01)

(58) Field of Classification Search
None
See application file for complete search history.

(56) References Cited

U.S. PATENT DOCUMENTS

| | | |
|---|---|---|
| 2004/0205448 A1 | 10/2004 | Grefenstette et al. |
| 2005/0060643 A1 | 3/2005 | Glass et al. |
| 2008/0275870 A1 | 11/2008 | Shanahan et al. |
| 2009/0190839 A1 | 7/2009 | Higgins |
| 2013/0339288 A1 | 12/2013 | Lamanna et al. |
| 2017/0098284 A1* | 4/2017 | Schneider .......... G06Q 10/1095 |
| 2018/0336639 A1* | 11/2018 | Dziabiak ................ G06Q 40/08 |

OTHER PUBLICATIONS

Search Report and Written Opinion from International Patent Application No. PCT/US2020/031692, dated Aug. 4, 2020.

* cited by examiner

*Primary Examiner* — Amresh Singh

(57) ABSTRACT

Systems and methods are described for linking records from different databases. A search may be performed for each record of a received record set for similar records based on having similar field values. Recommended records of the record set may be assigned with the identified similar records to sub-groups. Pairs of records may be formed for each record of the sub-group, and comparative and identifying features may be extracted from each field of the pairs of records. Then, a trained model may be applied to the differences to determine a similarity score. Cluster identifiers may be applied to records within each sub-group having similarity scores greater than a predetermined threshold. In response to a query for a requested record, all records having the same cluster identifier may be output on a graphical interface, allowing users to observe linked records for a person in the different databases.

20 Claims, 8 Drawing Sheets

RECORD MATCHING MODEL USING DEEP LEARNING FOR IMPROVED SCALABILITY AND ADAPTABILITY

CROSS-REFERENCE TO RELATED APPLICATIONS

This application claims the benefit of U.S. Provisional Application No. 62/843,955, filed May 6, 2019, which is incorporated herein in its entirety.

TECHNICAL FIELD

The present disclosure generally relates to using artificial intelligence via a model to link records from different databases, and in particular records associated with individual human beings.

SUMMARY

Systems and methods are described for link records from different databases, where conventional methodologies have unique challenges. A processor of a computer having memory may receive a record set that includes a plurality of records from a plurality of databases. The databases may include records associated with different people, where the same person may have records in each of the different databases, and it may be a challenge to identify which records are associated with the same person. The processor may search each record of the record set for similar records based on the similar records having similar field values. Recommended records of the record set may be identified and then assigned, along with one or more identified similar records to the recommended records, to sub-groups of records. The record set may then be stored as a plurality of record blocks, where each record block may include a predetermined number of sub-groups of records.

Matching records within every sub-group of records may then be identified on a block-by-block pairwise basis. To do so, each similar record may be paired with the other records of the sub-group to form pairs of records for the sub-group, and features may be extracted from each record field of each pair of records within each sub-group; for example, both comparative features and identifying features for each record field may be extracted, where the features reflect differences between the pair of records being compared. Then, a trained model may be applied to the extracted features for the pairs of records of each sub-group, where the model outputs a similarity score for each pair of records of each sub-group. The model may be trained to apply weights to the extracted features to output the similarity score for each pair of records. The similarity score may approximate a probability that a record of each pair of records matches the recommended record of its sub-group.

Once the similarity scores for a sub-group have been determined, cluster identifiers associated with each sub-group may be applied to records within each sub-group having similarity scores greater than a predetermined threshold, while records that do not have similarity scores meeting the threshold may be removed from the sub-group for reclassification. After a record set has been divided into identified clusters, queries may be used to identify records from the record set. In response to a query for a requested record, all records having the same cluster identifier as the requested record may be output on a graphical interface, allowing users to observe linked records for a person in the different databases. Further embodiments allow for online learning by the system for record linkage, where the trained model may be re-trained based on user feedback. Other additional features may include restricting user viewing and/or editing permissions, and versioning for records, allowing a user to track which clusters a record has been affiliated with previously.

BRIEF DESCRIPTION OF THE DRAWINGS

In the following drawings, like reference numbers are used to refer to like elements. Although the following figures depict various examples, the one or more implementations are not limited to the examples depicted in the figures.

DETAILED DESCRIPTION

Figure 1:
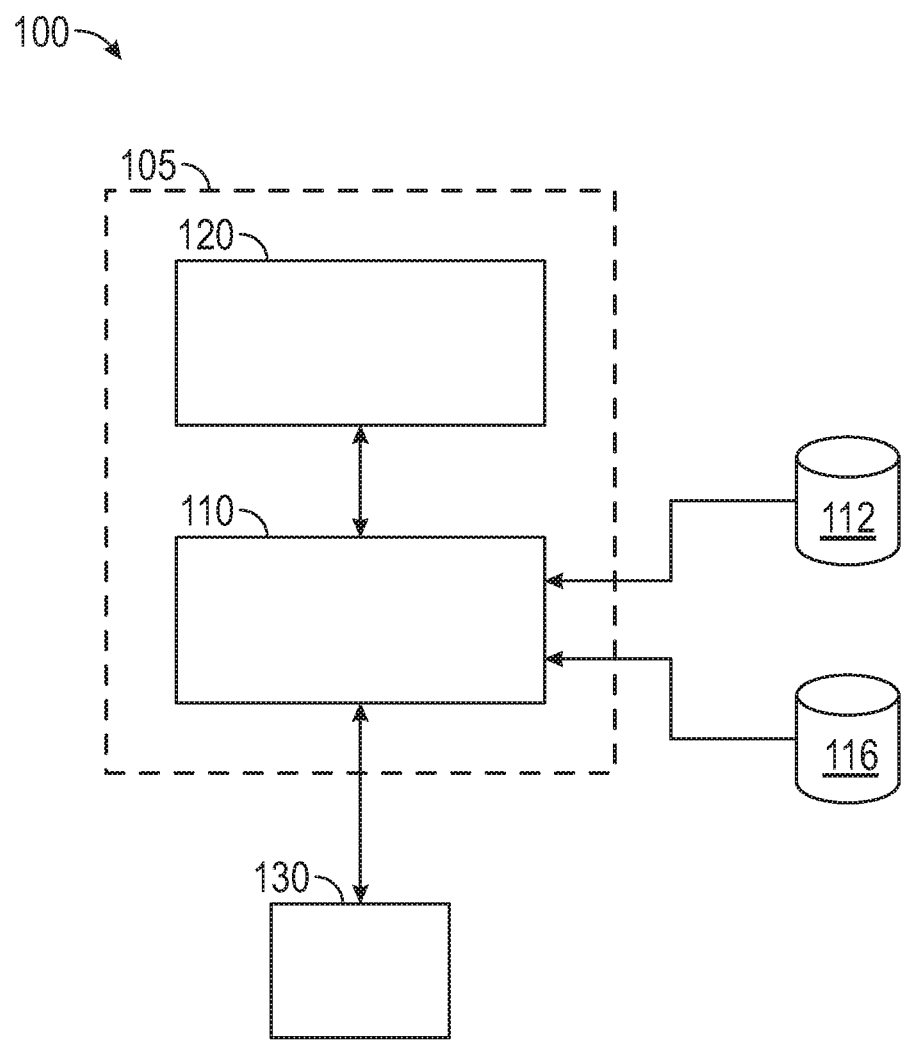
FIG. 1 shows a simplified block diagram of a specific embodiment for a system for linking records from different databases using a deep learning model.

Various barriers persist in the access and sharing of data between different organizations. Government agencies and community providers often cannot share information across siloed data sources, stifling coordination. Significant issues that complicate the integration of data across multiple sources relate to linking data at the individual person level. Very few local or national datasets are linked at the individual level; this has proven to be a highly difficult and resource-intensive endeavor compared to use of aggregate-level data. Issues with deduplication, or the process of identifying multiple records that refer to the same entity (i.e., person, product, incident), also plague many institutional databases. However, there are significant practical advantages to supporting individual linkage: this is the unit of analysis most appropriate for identifying real associations and meaningful interventions to improve, for example, health promotion strategies and well-being. Linking different data sources could help identify patients at highest risk of poor outcomes and refine intervention processes most likely to improve those outcomes.

The process of identifying multiple records that refer to the same entity is commonly called record linkage and may also be known as entity resolution or deduplication. At present, identifying the same people across different databases is a complex problem with insufficient solutions. The easiest solution for data deduplication is a deterministic record linkage (DRL) approach. Common indicators of a person's identity used by United States government agencies are social security number, name, and date of birth; but there are many more possible variables that can be used for re-identification. Deterministic record linkage may define algorithmic rules to decide exactly which information should be (a) present and (b) equal, between two records to conclude they belong to the same person. However, databases are rarely of sufficient quality for such a linkage approach: some databases don't store all information required, orthographic errors happen, people change names, data entry can be rushed, messy and never returned to.

An approach that takes into account these weaknesses is probabilistic record linkage. In the probabilistic linkage approach, indicators are combined in a statistical model to calculate an estimate of the likelihood that two records are from the same person. With PRL, one can derive probabilistic metrics of overlap, such as the Jaro-Winkler string distance, or the Levenshtein distance. See Winkler, W. E, "Overview of Record Linkage and Current Research Directions, "Statistical Research Division, U.S. Census Bureau (2006), and V. I. Levenshtein, "On the minimal redundancy of binary error—correcting codes, Information and Control," Vol. 28, Nr. 4, August 1975 (268-291), both of which are hereby incorporated by reference in their entirety. Both metrics aim to measure the minimum number of single-character transpositions required to change one word into the other, where the former is letter wise, whereas the latter allows deletion, insertion and substitution. By combining different metrics, probabilities of linkage can be derived. The Bayesian probabilistic linkage approach considers latent true individuals, with posterior distributions of linkages conditional on these latent individuals.

Solutions described herein apply a model for record linkage using artificial intelligence. The model may take the form of a deep neural network with fully connected layers that allows accounting for an expanding multitude of factors, such as the phonetic characterization of names, gender and name changes (i.e. women changing names when marrying). Deep neural networks are a class of machine learning algorithms that are omnipresent in complex problems such as image recognition and recommender systems. Deep neural nets implement the probabilistic approach and interpretation of classical linear statistical models, but are more focused on the predictive ability of a model, and they allow for non-linear relationships between variables. Deep neural nets especially outperform single-layer predictive models in the context of big data, where there are millions of data points, such as with record linkage.

FIG. 1 shows a simplified block diagram of a specific embodiment for system 100 for linking records from different databases using a deep learning model. The system 100 may include record linking platform 105, databases 112 and 116, and client device 130. The record linking platform 105, databases 112 and 116, and client device 130 may be communicatively coupled to each over via a network connection (i.e. using a local network or a remote network, such as the Internet). Record linking platform 105 may identify matching records from databases 112 and 116 based on using deep learning to identify and compare similarity scores from the records of the databases 112 and 116, which may be flagged with a cluster identifier after the analysis by the record linking platform 105. While two databases are shown in system 100, the invention is not limited in this regard, as the system is designed to operate on dozens of different databases being merged, with millions of records collectively. The record linking platform 105 performs the linking using cloud-based back end application 110, which communicates with the databases 112 and 116 and responds to queries by the client device 130. To do the matching and clustering, the backend application 110 transmits pairs of records to trained scoring model 120, which outputs a similarity score for the pairs of records it receives as inputs. The further operation of each element of system 100 is explained in greater detail below.

Figure 2:
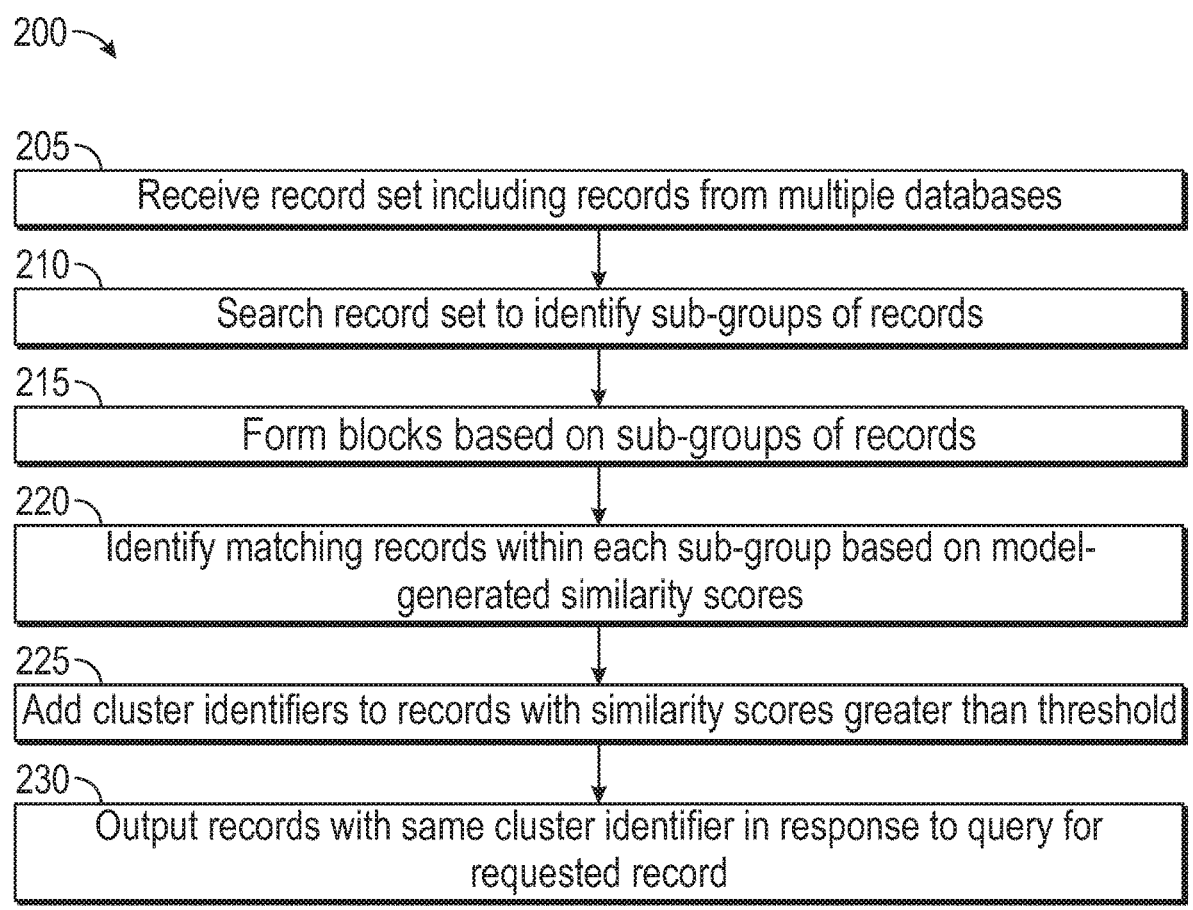
FIG. 2 shows a flow diagram for a specific embodiment of a method of linking records from different databases using a deep learning model.

FIG. 2 shows a specific embodiment of a flow diagram for a method 200 of linking records from different databases. A processor of a computer having memory may receive a record set that includes a plurality of records from a plurality of databases, such as databases 112 and 116, at step 205. As stated previously, different databases may have different fields and/or different field formats, making identification of matches difficult, and necessitating pairwise comparisons to identify matching records. When the sample size grows, due to adding more databases, for example, the number comparisons may become a computationally impossible task. A solution to this problem is blocking, where the full dataset is split in blocks of records, where pairwise comparisons are only performed within blocks. A block may be defined as a sub-group of records, where each record in the sub-group has a higher probability (than other records of the record set) of being a potential match to a specific recommended record. A number of suitable blocking algorithms may be used, including hash-based blocking, neighborhood based blocking, similarity blocking, etc. See Christen, Peter. 2012. "A Survey of Indexing Techniques for Scalable Record Linkage and Deduplication." IEEE Transactions on Knowledge and Data Engineering 24 (9): 1537-55, which is hereby incorporated by reference in its entirety. Another powerful blocking algorithm which may be used is locality sensitive hashing, which uses distance measures between entities that reduce the search space to be more closely proportional to the number of records received. See Paulevé, Loïc, HervéJégou, and Laurent Amsaleg. 2010. "Locality Sensitive Hashing: A Comparison of Hash Function Types and Querying Mechanisms." Pattern Recognition Letters 31 (11): 1348-58, which is also hereby incorporated by reference in its entirety.

To perform the blocking, the processor may search each record of the record set for similar records based on the similar records having similar field values at step 210. The search may be performed by any suitable full text search engine, for example, which may compare records using various similarity measures using any suitable preprocessing techniques, including Okapi BM25 (and any variants thereof), stemming (i.e. generating query variants to be more robust against variations in spellings, conjugations, etc.), phonetic similarity (i.e., mapping search terms onto a phonetic space to allow for searching based on phonetic similarity), cosine similarity, etc. The search engine may index all records and then perform searching based on record field values to identify potentially-matching records and rank them based on similarity. In an exemplary embodiment, the search engine may utilize a scoring system in combination with phonetic matching over a plurality of record fields, such as first name, last name, gender, race, date of birth, etc.

Also, a recommender system may be used to further provide scalability without requiring an exponential number of record comparisons. Recommended records of the record set may be identified using the similarity ranking of the search engine (e.g., by identifying a record of a sub-group of records with similarity to the most records of the sub-group, or any other suitable method), and then assigned, along with one or more identified similar records to the recommended records, to sub-groups of records. The record set may then be stored as a plurality of record blocks, where each record block includes a predetermined number of sub-groups of records at step 215. The record blocks may be based on the sub-groups created at step 210; for example, each block may include just one sub-group, or may include several sub-groups that the searching has identified as being similar.

Figure 3:
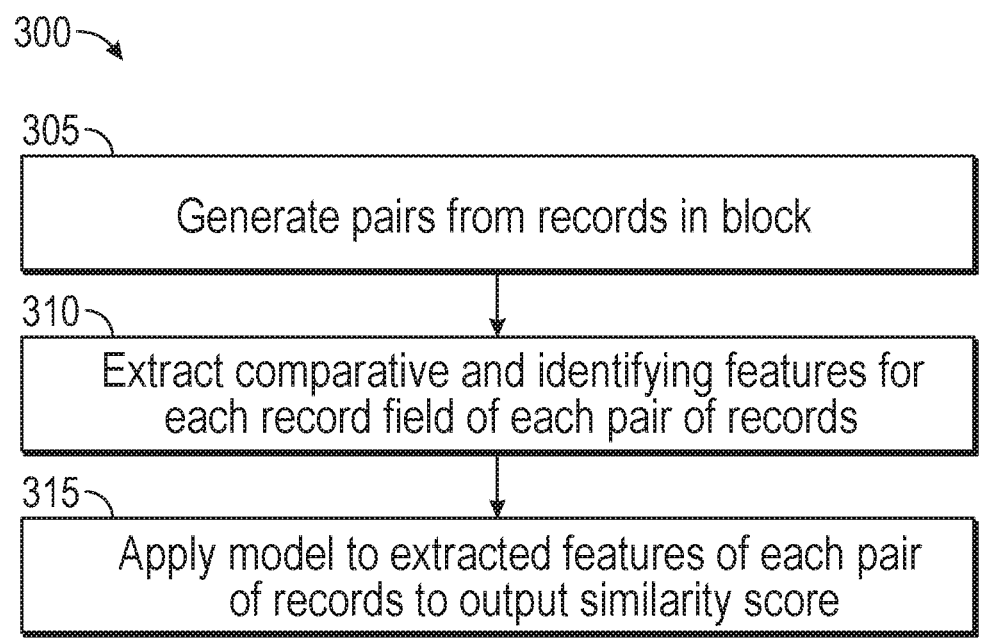
FIG. 3 shows a flow diagram of a specific embodiment of a method of identifying matching records in a sub-group using a trained scoring model.

Matching records within every sub-group of records may then be identified on a block-by-block pairwise basis based on model-generated similarity scores at step 220. Because of the blocking steps described above, the pairwise record matching can be performed at scale. The record-matching step 220 is explained in greater detail by FIG. 3, which shows a flow diagram of a specific embodiment of a method 300 of identifying matching records in a sub-group using a trained scoring model (e.g., the scoring model 120). Each similar record may be paired with the other records of the sub-group to form pairs of records for the block at step 305. For example, in a sub-group of records (R1, R2, R3, R4), where R1 is the recommended record, seven pairs of records may be analyzed for matching: (R1, R2), (R1, R3), (R1,R4), (R2, R3), (R2, R4), and (R3, R4). Features may be extracted from each record field of each pair of records within each sub-group at step 310. These extracted features may include comparative features and identifying features, where the features reflect differences between the pair of records being compared. That is, after obtaining the data, pairwise comparisons may be made between all records, and for each pair, binary and/or numeric features that represent the overlap between the two records may be extracted. The features extracted in an exemplary embodiment are listed in Table 1 and described below.

TABLE 1

Exemplary comparative and identifying features extracted

| Data Field | Features Extracted |
|---|---|
| First name | Jaro winkler |
| | Jaro winkler distance between metaphones |
| | Jaro winkler distance between metaphone (alternate encoding) |
| | Presence (2) |
| | Probability (2) |
| Middle Name | Jaro Winkler |
| | Jaro winkler distance between metaphones |
| | Jaro winkler distance between metaphone (alternate encoding) |
| | Presence (2) |
| Last Name | Jaro winkler |
| | Jaro winkler distance between metaphones |
| | Jaro winkler distance between metaphone (alternate encoding) |
| | Presence (2) |
| | Probability (2) |
| Sex | Jaro winkler |
| | Presence (2) |
| DOB | Jaro winkler |
| | Presence(2) |
| | Levenshtein distance |
| Race | Jaro winkler |
| | Presence(2) |
| Ethnicity | Jaro winkler |
| | Presence(2) |
| SSN | Jaro winkler |
| | Presence(2) |

When comparing, for each record, fields of the same type (e.g., first names, gender, etc.), both comparative features (i.e. direct comparison between the two fields) as well as identifying features, (i.e., a metric for each of the two fields) may be extracted. As stated above Table 1 lists exemplary features extracted for an exemplary set of record fields; fewer or more fields and features may be used for feature extraction in other embodiments. For comparative features, for example, the Jaro-Winkler distance between all fields of the same field type may be extracted and compared. For the string field values (e.g., names), the Jaro-Winkler distance between metaphones may also be determined with two different encoding models. For the date of birth, the extracted comparative features may also include the Levenshtein distance. Both the Jaro-Winkler and the Levenshtein distance quantify how many characters/integers that would need to change to obtain the same value for a pair of records being compared.

Exemplary identifying features may include two additional features for each field indicating whether or not the field is missing in each record of the pair or not. This avoids the possibility that two empty strings (" " and " ") are classified as highly similar, and by extension helps the model identify to which variables should be weighted more or less for determination of similarity score. Furthermore, for the first and last name, a probability of the name in the data set as a whole may be included as an identifying feature. Finally, a label indicating whether the two records being compared are a true link may be included for each pair, indicating whether or not the two records represent the same person. The label may be responsive to direct user input, either during training, or after the model is live, as is described in further detail below, or may be populated by the output of the model after the model has been applied to the pair of records. Once the features are extracted, they can be submitted to the modeling stage.

A trained model may be applied to the differences for the record fields of each sub-group, where the model outputs a similarity score for each record of each sub-group at step 315. The model may be trained to apply weights to the generated differences to output the similarity score for each record. The similarity score may approximate a probability that each record matches the recommended record of its sub-group.

Returning to FIG. 2, once the similarity scores for a sub-group have been determined, cluster identifiers associated with each sub-group may be applied to records within each sub-group having similarity scores greater than a predetermined threshold at step 225. To go from pairwise record comparisons to reconciled records, the similarity scores may be submitted to a clustering algorithm, which may consider the similarity scores of all records, and further improve scalability. Several clustering strategies may be utilized to assist in the clustering, such as hierarchy-based algorithms (which may seek to build a hierarchy of clusters), and/or information-theoretic algorithms (which may use the strength of connections to improve community detection). The clustering algorithm may generate clusters from the blocks of records such that records are added to and persisted in clusters where their similarity scores to other records in the cluster will be the highest. Records that do not have similarity scores meeting the threshold (which may be any predetermined value reflecting probability of a match, e.g., 0.75, 0.9, etc.) may be removed from the sub-group for reclassification.

After clustering, the records and similarity data may be stored in a secure database with object versioning. Each record may be assigned a linked-entity-id, indicating its cluster identity. The data may be accessible with fine-grained column-wise permissions. In an exemplary embodiment, all historic version values can be queried with their time of last write. After a record set has been processed and cluster identifiers have been assigned, they may be used to provide linked records in response to queries for individual records from the record set. In response to a query for a requested record, all records having the same cluster identifier as the requested record may be output on a graphical interface at step 230, allowing users to observe linked records for a person in the different databases.

Figure 4:
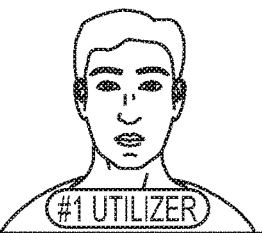
FIG. 4 is a screenshot illustrating a requested record, and records having the same cluster identifier as the requested record output on a graphical interface, according to an embodiment.

FIG. 4 is a screenshot of a graphical interface 400 illustrating a requested record 405, and records 410 and 425 having the same cluster identifier (not shown) as the requested record 405, according to an embodiment. Graphical interface 400 may optionally include several filtering options 407, including filters by database name, and an option to link additional records that are not output on the graphical interface 400. Linked records 410 and 425 each include options to view entity sets 415 associated with each linked record and to unlink each linked record from the requested record 405. The view entity set object 415 may allow a user to view neighboring records (i.e., the most similar records within the cluster), view the entire cluster to which a linked record belongs, and/or view a list of underlying record sets for each linked record at a top level, for example.

Record linkage happens statically in conventional systems, and there is no way for data managers to inspect and correct results. Whenever manual changes are made in a conventional setting, this only impacts the output, not the scoring system itself. To address these problems, embodiments are provided herein that allow for manual user input via an application programmatic interface (API) or a web application outputting the graphical interface 400, for example. A user selection may be received, via the graphical interface 400, associated with one of the records having the same cluster identifier as the requested record that may indicate that the one of the records either matches or does not match the requested record. To indicate that a linked record, such as linked record 410, matches the requested record 405, a selection may be made of an object on the graphical interface, such as a "confirm link" object (not shown). In response to receiving the selection, the weights applied to the generated differences by the trained model may be modified based on the received selection. To indicate that the linked record 410 does not match the requested record, a selection may be made of the unlink object 420. In response to selection of a link confirmation or unlink object, the trained model may be reapplied to the record set using the modified weights to recalculate at least one of the similarity scores of the records having the same cluster identifier as the requested record, thereby allowing the trained model to learn while the system 105 is online based on user feedback (in the form of the selection).

When the selection indicates that the one of the records matches the requested record, the modifying the weights based on the received selection may include re-training the trained model using the one of the records having the same cluster identifier flagged as matching the requested record. Additional training samples may be provided by generating a plurality of negative vectors, indicating that the selected record does not match any other recommended record. The retraining may further using the plurality of generated negative vectors associated with the one of the records flagged as not matching other recommended records to improve performance of the trained model for similarity scoring. When the selection indicates that the one of the records does not match the requested record, the modifying the weights based on the received selection may include re-training the trained model using just the one of the records having the same cluster identifier flagged as not matching the requested record. While not providing as much useful feedback as a link confirmation, unlinking a record from its sub-group still may improve performance of the trained model.

As shown in graphical interface 400, a variety of field values may be displayed for the requested record 405 and matching records 410 and 425. In an exemplary embodiment, the outputted records having the same cluster identifier may be displayed only with fields associated with a requesting user permission level. Fine-grained permissions can be assigned for users to access and modify data. Permissions can be set at the property (column) level, at the level of personally identifiable information ("PII"), or at the dataset level. This means, for example, that based on permission level, the PII, such as name, date of birth or social security number, may be hidden to lower permission levels, while the non-PII, such as gender or race may remain accessible. As seen in interface 400, the displayed fields tied to requesting user permission level may include names associated with a person whose identity is associated with a sub-group, identification numbers (such as a social security number), a data of birth, and demographic information, which may help a user confirm the linking or unlink records. Other fields not shown may include cluster identifier and/or similarity score. When querying linked data entities, only fields that are present in the intersection of accessible columns may be returned, based on permission level. After modifying data, incremental re-linking of modified records may be triggered on the modified records. Users can share de-identified linked datasets, grant other users permissions to their data and request the creation of synthetic data sets consisting of collection of linked data sets they have access to. Only accessible and permissioned fields may be returned from such requests, in some embodiments.

In another embodiment, a version field for each record in the cluster may be displayed. The cluster identifiers added to the records within each sub-group maybe associated with a version value, such that when a record having the cluster identifier is subsequently re-assigned to a different sub-group, the version value links the re-assigned record to the sub-group. This allows a user to see other sub-groups, where records for the same person may be linked erroneously, for example, and may ultimately lead to better performance by the model and the system as a whole. Allowing users to dynamically change labels associated with records may avoid having to re-link data from scratch, and versioned data access means we can accurately re-construct what a user has retrieved from the API at any point in time.

In some embodiments, a selection may be received, via the graphical interface 400, associated with one of the records 410 and 425 having the same cluster identifier as the requested record 405. The selection may indicate that the one of the records either matches or does not match the requested record, as described above, where the selection is based on the permission level including the ability to modify data in the data set. That is, the appearance of "confirm link" and "unlink" objects may be tied to the permission level of the user, restricting the ability to retrain the model to users having a sufficient permission level.

Figure 5:
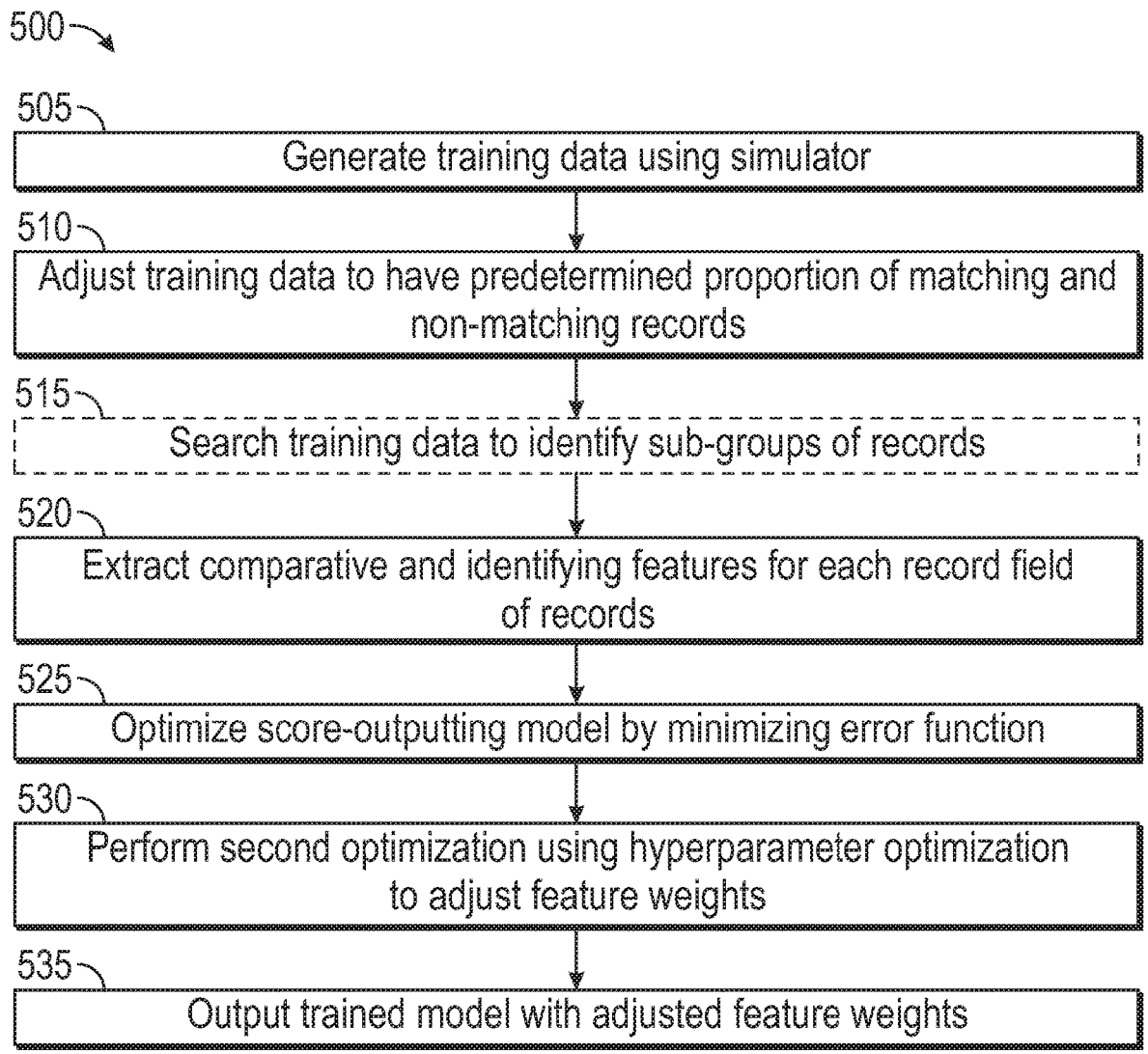
FIG. 5 shows a flow diagram of a specific embodiment of a method of training a deep learning model for outputting similarity scores between records.
Figure 6:
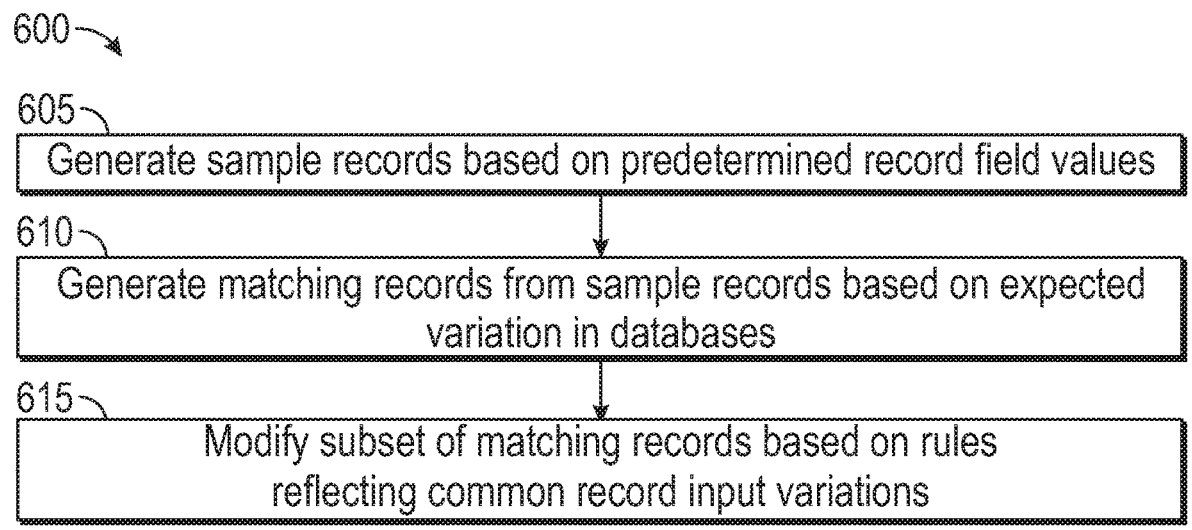
FIG. 6 shows a flow diagram of a specific embodiment of a method of generating training data for training the deep learning model for outputting similarity scores between records.

Conventional deep learning models have several problems in the context of linking records tied to persons, as opposed to inventories of objects. Accordingly, innovative training methods must be used to train an optimal model for determining similarity scores between records. FIG. 5 shows a flow diagram of a specific embodiment of a method 500 of training a deep learning model for outputting similarity scores between records. Training data comprising sample records and matching records derived from the sample records may be generated at step 505. FIG. 6 shows a flow diagram of a specific embodiment of a method 600 of generating training data for training the deep learning model for outputting similarity scores between records. The model may be trained using simulated data. With simulated data the input training data may be made to represent the population, and control which records in the training data are based on the same person. Since a database of 100 cases results in 4450 person-to-person comparisons, manually annotating a training database is time-consuming, error-prone and tedious. Moreover, to train a deep neural net, ideally millions of data points are used to train the model with data that is as close as possible to the total population. In an exemplary embodiment, data may be simulated for 7 different fields: (1) first name, (2) middle name (3) last name, (4) social security number, (5) sex, (6) date of birth, (7) race and (8) ethnicity.

At step 605, sample records may be generated based on predetermined record field values. The predetermined record field values of all the sample records may reflect a desired distribution of field values, such as values that may actually appear in live databases. In an exemplary embodiment, first and last names may be generated using actual United States census data on first and last names to reflect true probabilities in the population. The proportions of different values for sex, race and ethnicity in our simulated data may also be generated based on proportions in the US Census. Dates of birth may be chosen so that ages follow a truncated normal distribution, with a mean of 45 years old, standard deviation of 35, and limited to the interval between 5 and 100 to more closely simulate actual government records. Similarly, social security numbers may be generated (as they are in reality) using unique, random 9-digit sequences, independent from location and age.

Records that match the sample records may be generated at step 610, where the records that match the samples may be generated based on expected variation in different databases. Such variants may include, for example, typographic errors made during input by humans, nicknames and aliases, non-standard answers (e.g., to questions pertaining to gender, race, and ethnicity), and differing date entry formats. Realistic typographic mistakes may be included, where a QWERTY keyboard is assumed for string variables (e.g., names), and an alphanumeric keyboard is used for numeric variables. For each character, a predetermined value representing chance of a typographic error may be used to generate matching records (e.g., there is a 1% chance of a typographic error, so 1% of characters of the generated matching records will have such an error). To account for nickname use, first names may be replaced with frequently used nicknames (e.g., Robert→Bob) for a predetermined percentage of generated matching records. For alternative birth date formats, a predetermined percentage of generated matching records may include birth dates where month and day are reversed. The typographic errors in birth dates can still result in realistic birth dates (and can as such not be prevented by a date checker and end up in production databases). While these are examples of variations that may be accounted for in the training data, any suitable modifications may be made that account for actual variation in live databases. For example, with a probability of 1%, a twin may be generated in training data sets, where the last name, date of birth, race and ethnicity are the same for two different people.

Furthermore, a subset of the generated records that match the sample records may be modified based on predetermined rules that reflect variation in record inputting at step 615. One significant for the similarity scoring model is developing one that is flexible on the input. When only certain fields are present, the model should be able to derive to what point re-identification is possible. Therefore, in an exemplary set of training data, records may be modified with a predetermined rule that first names and last names are missing with a predetermined probability (e.g., 5%, 10%, 20%, etc.). For all other fields, where data might not be collected as diligently as the name data, different probabilities may be used, either individually per field or using a single probability for every non-name field (e.g., a 30%, 50%, or 60% chance of missing a value for every non-name field). While this may lead to records in the training data where linkage is impossible, this may more accurately reflect the real-life situation. The disadvantage is that this may complicate the evaluation of the model during training: true links that are in fact undiscoverable may in fact be false links.

The simulator may be used to generate different training sets for different stages of the training of the deep learning model for determining similarity score. In an exemplary embodiment, the largest group of records may be generated for the first optimization of training (e.g., 1,000,000 people may be simulated, with an average of 10 records per person, may be used to train the model). A smaller data set may be used in development, such as for a secondary optimization phase (e.g., simulating 100 people with approximately 1000 records for use during hyperparameter optimization). Finally, a separate, also smaller data set may be used for final validation before use of the model in the production environment (e.g. a different 100 people may be simulated with another approximately 1000 records). The result of the simulator, in an exemplary embodiment, may be a file of comma-separated values (csv) with one row for each record. As such, the same person may be present in multiple lines, and the challenge for the model is to identify the rows corresponding to the same person.

Returning to FIG. 5, at step 510 the training data generated by the simulator may be adjusted to have a predetermined proportion of matching and non-matching records. As a data set gets larger, the probability of true links (i.e. records that match each other) decreases dramatically. As this probability decreases, a model predicting all comparisons do not match (i.e. with a 0% chance of a true link) will become increasingly accurate, to the point that any other model will have difficulty performing better (even though there are true link pairs in the data set). To improve the model performance, several optimizations may be used during the training process. For example, a weighted training data set may be used, where the proportions of true links is approximately equal to the non-matching records, and/or the outcome metrics (e.g., loss, accuracy, etc.) may be weighed by the proportion of true links in the training dataset. However, weighing the outcome metrics by the proportions in the training dataset makes the implicit assumption that the proportions reflect reality, where in fact the real true link rate is an unknown variable. Moreover, because of the large number of possible comparisons for a large training data set, generating the training dataset with equal proportions of labels (i.e. approximately equal amounts of matching and non-matching records) has the added benefit of reducing the computing time during the feature extraction. In an exemplary embodiment, a random sample of the negative labels with its size equal to the number of positive labels may be drawn from the generating training data.

Then, as is done with a live data set, each record of the training data may be searched at optional step 515 for similar records based on the similar records having similar field values to the sample records. The sample records and one or more identified similar records to the sample records may then be assigned to sub-groups of records. While the training data is being sorted into sub-groups, features from each record field of each record within each sub-group may be extracted, including both comparative features and identifying features for each record field, as described above.

The score-outputting model may be optimized by modifying feature weights applied to differences between extracted features of the records of the sub-group and the extracted features of the sample record to minimize an error function between determined similarity scores and ground truths of the training data at step 525. In a database R with n records, a feature matrix X with all extracted features (e.g., the features expressed in Table 1), for all record pairs $(r^i, r^j)$ (where the records are expressed as vectors of extracted features within the feature matrix) may be determined as shown in equation (1):

$$\forall 1 \leq i \leq n(i < i+1), \forall 1 \leq j \leq n(j < j+1): X^{ij} = f(r^i, r^j) \quad (1)$$

Likewise, for all pairs of records $(r^i, r^j)$, the label $Y^{ij}$, indicating whether or not $r^i$ and $r^j$ are records belonging to the same person. With a deep neural net, the feature matrix may be transformed in the output variable $Y^{ij*} \in (0,1)$ representing the estimate of the likelihood that records $r^i$ and $r^j$ represent the same person:

$$f: X \rightarrow Y^*. \quad (2)$$

The function $f(X)$ may be obtained by minimizing the loss function $\mathcal{L}$. The cross-entropy log shown in equation (3) may be used as the loss function, in an exemplary embodiment:

$$\mathcal{L}_{(f(X),t)} = t \ln(f(X)) - (1-t)\ln(1-f(X)) \quad (3),$$

where $t=(1+y)/2$ and $t \in \{0,1\}$.

After the weightings for the extracted features have been set at step 525, a second optimization may be performed on the optimized score-outputting model using hyperparameter optimization for a plurality of error cutoffs at step 530. After the secondary optimization is complete, the trained model is output with adjusted feature weights at step 535. The feature weights may be adjusted during hyperparameter optimization based on a user-selected error rate for the hyperparameters, which are aspects of the neural network used for the model for similarity score itself. The following are examples of hyperparameters and exemplary constraints used for the hyperparameter optimization:

Number of dense layers $\in [1,5]$,
Number of dense nodes per layer $\in [5,500]$,
Activation function $\in \{$sigmoid, relu$\}$,
Learning rate $\in [10^{-6}, 10^{-2}]$, with a log-uniform prior.

A feed-forward neural network with the Adam optimizer ($\beta_1=0.9$, $\beta_2=0.999$, $\in=10^{-7}$) may be used to minimize the loss function of the hyperparameters with a Bayesian optimizer using Gaussian Processes, as provided in scikit-optimise, released Feb. 9, 2018, https://zenodo.org/record/1170575#.Xq_G9ahKjIU, which is hereby incorporated by reference.

In the hyperparameter optimization, the area under the curve may be selected as the optimality criterion in an exemplary embodiment. As a consequence of the dependency between the probability of true links and the sample size, the balance between the true positive rate (i.e., recall), and the false positive rate (i.e., fall-out) may also depend on the dataset size and the number of repeated records, as the frequency of matches decreases may cause the model to be less effective at identifying true positives. This dependency may propagate to all error rates (precision, accuracy, etc.). Furthermore, the dataset size also depends on the number of repeated subjects, a variable that is generally not known for live data sets from different databases.

In the exemplary construction of the training data described above, equal proportions of matching and non-matching labeled-records were utilized. However, in reality the proportions will be highly unequal, and will change with the size of the data. As such, in an exemplary embodiment error rates may not be optimized at specific cutoffs (e.g., 0.5 with a sigmoid or relu activation function), but rather the balance of the true positive rate and the false positive rate may instead be optimized for a range of cutoff's (e.g., between 0 and 1 for the sigmoid or relu activation function). The area under the curve effectively optimizes the trade-off between true positive rate and false negative rate at all levels, and therefore all proportions of labels. This may be achieved by optimizing the area under the curve (AUC) of the receiver-operator-curve (ROC) in the hyperparameter optimization.

Figure 7:
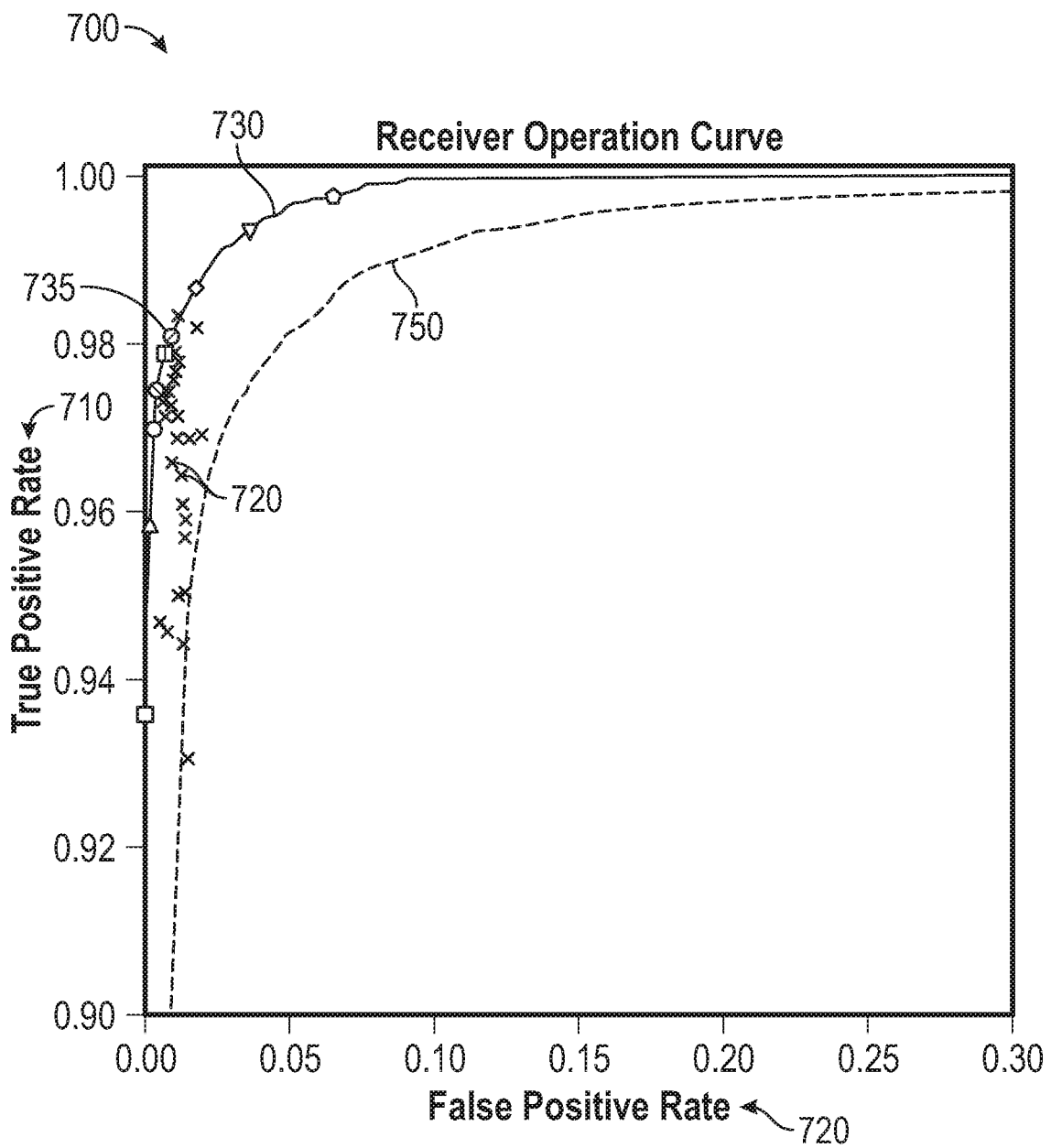
FIG. 7 shows a receiver operator curve for an optimal model for outputting similarity scores between records, according to an embodiment.

FIG. 7 shows a receiver operator curve (ROC) diagram 700 for an optimal model for outputting similarity scores between records, according to an embodiment. The area under the curve, an exemplary metric of optimality (as described above), is the surface below ROC 730 in exemplary diagram 700. Diagram 700 shows the trade-off between the true positive rate 710 and the false positive rate 720. The curve 730 shows the ROC for an optimal model trained as described in method 500, where points on curve 730 such as point 735 represent specific trade-off points (where higher detection of true positives correspond to also higher false positive rate). Gray crosses 740 represent the trade-off for all models tested in the hyperparameter optimization (described above, at step 530), where different error rates selected by a user correspond to different trade-offs between true positive rate 710 and false positive rate 720. By contrast, curve 750 represents a baseline ROC for a conventional model using logistic regression. It can be seen that for all false positive rates, the true positive rate of the deep neural net exceeds the true positive rate of the probabilistic model (i.e. curve 730 has greater area under the curve for any false positive rate compared to curve 750).

As seen in diagram 700, an optimal model, represented by curve 730, maximizes the area under the curve, where the true positive rate is maximal for any fixed false positive rate. The optimal model represented by curve 730, may be constructed by (1) computing the similarity scores for the test data, (2) varying the cutoff score applied to them (where cutoff score corresponds to a user-selected false positive rate), and (3) deriving the actual error rates based on the cutoff score input to the hyperparameter optimization algorithm. When none of the hyperparameter combinations exceeds the receiver operator curve of a second set of training data (e.g., the verification data generated using the simulator, as described above), it may indicate that the current optimal is an optimal model.

Figure 8:
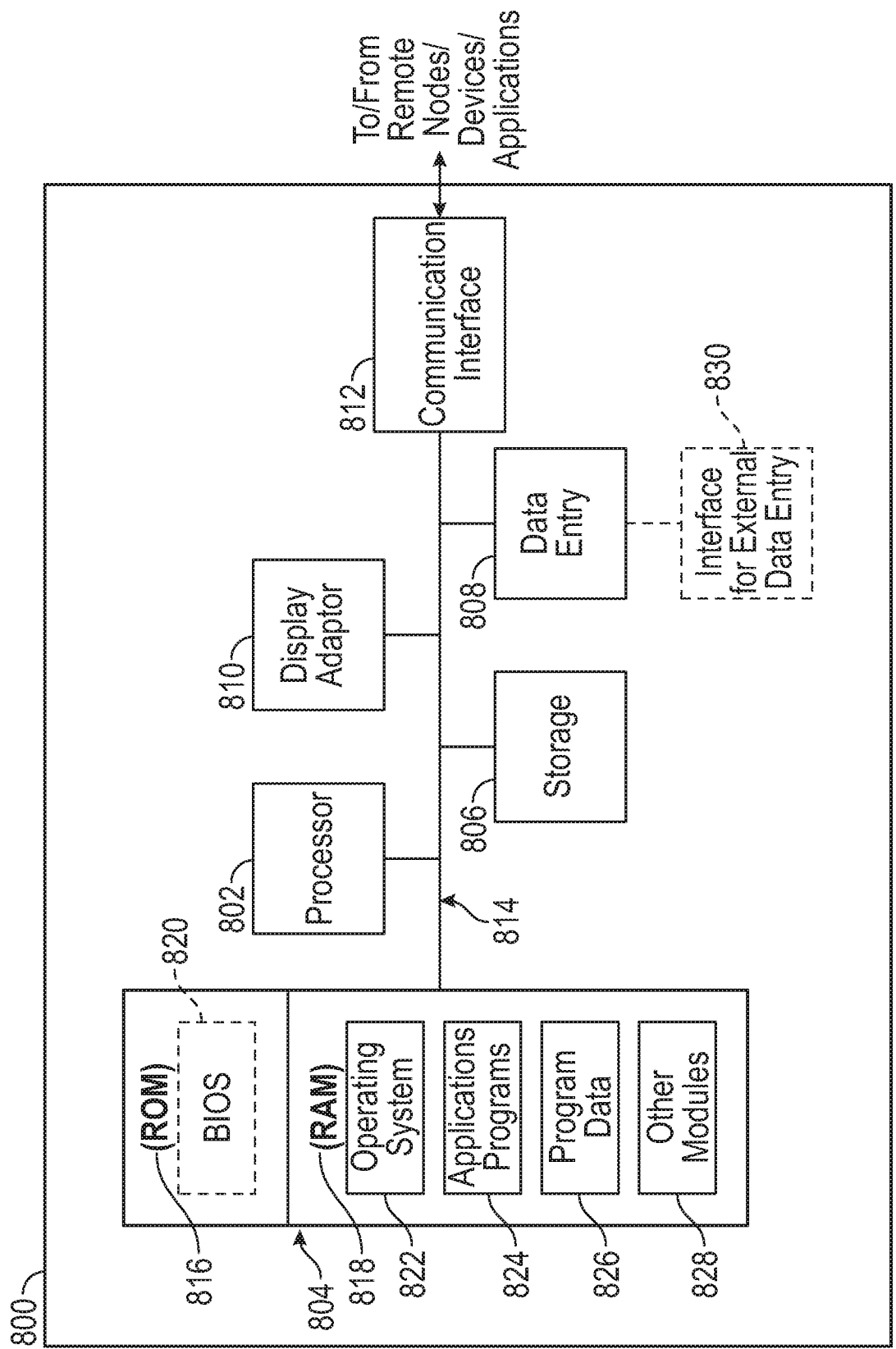
FIG. 8 depicts a block diagram illustrating an exemplary computing system for execution of the operations comprising various embodiments of the disclosure.

FIG. 8 is a block diagram of an exemplary system used to automatically linking records from different databases using a deep learning model (i.e., any devices used to implement system 105). With reference to FIG. 8, an exemplary system for implementing the subject matter disclosed herein, including the methods described above, includes a hardware device 800, including a processing unit 802, memory 804, storage 806, data entry module 808, display adapter 810, communication interface 812, and a bus 814 that couples elements 804-812 to the processing unit 802.

The bus 814 may comprise any type of bus architecture. Examples include a memory bus, a peripheral bus, a local bus, etc. The processing unit 802 is an instruction execution machine, apparatus, or device and may comprise a microprocessor, a digital signal processor, a graphics processing unit, an application specific integrated circuit (ASIC), a field programmable gate array (FPGA), etc. The processing unit 802 may be configured to execute program instructions stored in memory 804 and/or storage 806 and/or received via data entry module 808.

The memory 804 may include read only memory (ROM) 816 and random access memory (RAM) 818. Memory 804 may be configured to store program instructions and data during operation of device 800. In various embodiments, memory 804 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 804 may also include nonvolatile memory technologies such as nonvolatile flash RAM (NVRAM) or ROM. In some embodiments, it is contemplated that memory 804 may include a combination of technologies such as the foregoing, as well as other technologies not specifically mentioned. When the subject matter is implemented in a computer system, a basic input/output system (BIOS) 820, containing the basic routines that help to transfer information between elements within the computer system, such as during start-up, is stored in ROM 816.

The storage 806 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 800.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment.

As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 806, ROM 816 or RAM 818, including an operating system 822, one or more applications programs 824, program data 826, and other program modules 828. A user may enter commands and information into the hardware device 800 through data entry module 808. Data entry module 808 may include mechanisms such as a keyboard, a touch screen, a pointing device, etc. Other external input devices (not shown) are connected to the hardware device 800 via external data entry interface 830. By way of example and not limitation, external input devices may include a microphone, joystick, game pad, satellite dish, scanner, or the like. In some embodiments, external input devices may include video or audio input devices such as a video camera, a still camera, etc. Data entry module 808 may be configured to receive input from one or more users of device 800 and to deliver such input to processing unit 802 and/or memory 804 via bus 814.

The hardware device 800 may operate in a networked environment using logical connections to one or more remote nodes (not shown) via communication interface 812. The remote node may be another computer, a server, a router, a peer device or other common network node, and typically includes many or all of the elements described above relative to the hardware device 800. The communication interface 812 may interface with a wireless network and/or a wired network. Examples of wireless networks include, for example, a BLUETOOTH network, a wireless personal area network, a wireless 802.12 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 812 may include logic configured to support direct memory access (DMA) transfers between memory 804 and other devices.

In a networked environment, program modules depicted relative to the hardware device 800, or portions thereof, may be stored in a remote storage device, such as, for example, on a server. It will be appreciated that other hardware and/or software to establish a communications link between the hardware device 800 and other devices may be used.

It should be understood that the arrangement of hardware device 800 illustrated in FIG. 8 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 800.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 8.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

The subject matter has been described herein with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In the description herein, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of a preferred embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

What is claimed is:

1. A method comprising:

receiving, by a processor of a computer having memory, a record set comprising a plurality of records from a plurality of databases;

searching, by the processor for each record, the record set for similar records based on the similar records having similar field values;

assigning, by the processor, recommended records of the record set and one or more identified similar records to the recommended records to sub-groups of records;

storing, by the processor, the record set as a plurality of record blocks, each record block comprising a predetermined number of sub-groups of records;

identifying, by the processor, matching records within every sub-group of records on a block-by-block pairwise basis, the identifying comprising:
pairing each record of the sub-group to form pairs of records for the sub-group;
extracting features from each record field of each pair of records of each sub-group, the features comprising both comparative features and identifying features for each record field; and
applying a trained model to the extracted features of each sub-group, the applying outputting a similarity score to each record of each sub-group that approximates a probability that each record matches the recommended record of its sub-group, the model being trained to apply weights to the extracted features to output the similarity score for each record;

adding, by the processor, cluster identifiers associated with each sub-group to records within each sub-group having similarity scores greater than a predetermined threshold; and outputting, by the processor, all records having the same cluster identifier as a requested record in response to a query for the requested record, the outputted records having the same cluster identifier being displayed on a graphical interface.

2. The method of claim 1, further comprising receiving a selection, via the graphical interface, associated with one of the records having the same cluster identifier as the requested record, the selection indicating that the one of the records either matches or does not match the requested record, and modifying, by the processor in response to receiving the selection, the weights applied to the extracted features by the trained model based on the received selection.

3. The method of claim 2, further comprising re-applying, by the processor, the trained model to the record set using the modified weights to recalculate at least one of the similarity scores of the records having the same cluster identifier as the requested record.

4. The method of claim 2, the selection indicating that the one of the records matches the requested record, the modifying the weights based on the received selection comprising re-training the trained model using the one of the records having the same cluster identifier flagged as matching the requested record and further using a plurality of generated negative vectors associated with the one of the records flagged as not matching other recommended records.

5. The method of claim 2, the selection indicating that the one of the records does not match the requested record, the modifying the weights based on the received selection comprising re-training the trained model using the one of the records having the same cluster identifier flagged as not matching the requested record.

6. The method of claim 1, the trained model being trained using simulated data, the simulated data being generated by:
generating, by the processor, sample records based on predetermined record field values;
generating, by the processor, records that match the sample records, the generating the records that match being based on expected variation in different databases; and
modifying, by the processor, a subset of the generated records that match the sample records based on predetermined rules that reflect variation in record inputting.

7. The method of claim 1, the trained model being trained by:
generating, by the processor, training data comprising sample records and matching records derived from the sample records;
adjusting, by the processor, the training data to have a predetermined proportion of matching and non-matching records;
searching, by the processor for each record, the training data for similar records based on the similar records having similar field values to the sample records;
assigning, by the processor, the sample records and one or more identified similar records to the sample records to sub-groups of records
extracting features from each record field of each record within each sub-group, the features comprising both comparative features and identifying features for each record field;
optimizing, by the processor, a score-outputting model by modifying feature weights applied to differences between extracted features of the records of the sub-group and the extracted features of the sample record to minimize an error function between determined similarity scores and ground truths of the training data;
performing, by the processor, a second optimization on the optimized score-outputting model using hyperparameter optimization for a plurality of error cutoffs and adjusting the feature weights based on a user-selected error rate; and
outputting, by the processor, the trained model with adjusted feature weights.

8. The method of claim 7, the predetermined proportion of matching and non-matching records having a greater portion of matches than present in the record set.

9. The method of claim 1, the outputted records having the same cluster identifier being displayed only with fields associated with a requesting user permission level, the method further comprising receiving a selection, via the graphical interface, associated with one of the records having the same cluster identifier as the requested record, the selection indicating that the one of the records either matches or does not match the requested record, the selection being based on the permission level including the ability to modify data in the data set.

10. The method of claim 1, the cluster identifiers added to the records within each sub-group being associated with a version value, such that when a record having the cluster identifier is subsequently re-assigned to a different sub-group, the version value links the re-assigned record to the sub-group.

11. A computer program product comprising computer-readable program code to be executed by one or more processors when retrieved from a non-transitory computer-readable medium, the program code including instructions to:
receive a record set comprising a plurality of records from a plurality of databases;
search the record set for similar records based on the similar records having similar field values;
assign recommended records of the record set and one or more identified similar records to the recommended records to sub-groups of records;
store the record set as a plurality of record blocks, each record block comprising a predetermined number of sub-groups of records;
identify matching records within every sub-group of records on a block-by-block basis, the identifying comprising:
pairing each record of the sub-group to form pairs of records for the sub-group;
extracting features from each record field of each pair of records of each sub-group, the features comprising both comparative features and identifying features for each record field; and
applying a trained model to the extracted features of each sub-group, the applying outputting a similarity score to each record of each sub-group that approximates a probability that each record matches the recommended record of its sub-group, the model being trained to apply weights to the extracted features to output the similarity score for each record;
add cluster identifiers associated with each sub-group to records within each sub-group having similarity scores greater than a predetermined threshold; and
output all records having the same cluster identifier as a requested record in response to a query for the requested record, the outputted records having the same cluster identifier being displayed on a graphical interface.

12. The computer program product of claim 11, the computer program product further comprising instructions to receive a selection, via the graphical interface, associated with one of the records having the same cluster identifier as the requested record, the selection indicating that the one of the records either matches or does not match the requested record, and modifying, by the processor in response to receiving the selection, the weights applied to the extracted features by the trained model based on the received selection.

13. The computer program product of claim 12, the computer program product further comprising instructions to re-apply the trained model to the record set using the modified weights to recalculate at least one of the similarity scores of the records having the same cluster identifier as the requested record.

14. The computer program product of claim 12, the selection indicating that the one of the records matches the requested record, the modifying the weights based on the received selection comprising re-training the trained model using the one of the records having the same cluster identifier flagged as matching the requested record and further using a plurality of generated negative vectors associated with the one of the records flagged as not matching other recommended records.

15. The computer program product of claim 12, the selection indicating that the one of the records does not match the requested record, the modifying the weights based on the received selection comprising re-training the trained model using the one of the records having the same cluster identifier flagged as not matching the requested record.

16. The computer program product of claim 11, the trained model being trained using simulated data, the simulated data being generated by:
generating, by the processor, sample records based on predetermined record field values;
generating, by the processor, records that match the sample records, the generating the records that match being based on expected variation in different databases; and
modifying, by the processor, a subset of the generated records that match the sample records based on predetermined rules that reflect variation in record inputting.

17. The computer program product of claim 11, the trained model being trained by:
generating training data comprising sample records and matching records derived from the sample records;
adjusting the training data to have a predetermined proportion of matching and non-matching records;
searching, for each record, the training data for similar records based on the similar records having similar field values to the sample records;
assigning the sample records and one or more identified similar records to the sample records to sub-groups of records
extracting features from each record field of each record within each sub-group, the features comprising both comparative features and identifying features for each record field;
optimizing a score-outputting model by modifying feature weights applied to differences between extracted features of the records of the sub-group and the extracted features of the sample record to minimize an error function between determined similarity scores and ground truths of the training data;
performing a second optimization on the optimized score-outputting model using hyperparameter optimization for a plurality of error cutoffs and adjusting the feature weights based on a user-selected error rate; and
outputting the trained model with adjusted feature weights.

18. The computer program product of claim 17, the predetermined proportion of matching and non-matching records having a greater portion of matches than present in the record set.

19. The computer program product of claim 11, the outputted records having the same cluster identifier being displayed only with fields associated with a requesting user permission level, the computer program product further comprising instructions to receive a selection, via the graphical interface, associated with one of the records having the same cluster identifier as the requested record, the selection indicating that the one of the records either matches or does not match the requested record, the selection being based on the permission level including the ability to modify data in the data set.

20. The computer program product of claim 11, the cluster identifiers added to the records within each sub-group being associated with a version value, such that when a record having the cluster identifier is subsequently re-assigned to a different sub-group, the version value links the re-assigned record to the sub-group.

* * * * *